US008725911B2

(12) United States Patent
Karaoguz et al.

(10) Patent No.: US 8,725,911 B2
(45) Date of Patent: *May 13, 2014

(54) AUTOMATIC ACCESS AND CONTROL OF MEDIA PERIPHERALS ON A MEDIA EXCHANGE NETWORK

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/459,458

(22) Filed: Apr. 30, 2012

(65) Prior Publication Data
US 2012/0221749 A1 Aug. 30, 2012

Related U.S. Application Data

(63) Continuation of application No. 10/672,601, filed on Sep. 26, 2003, now Pat. No. 8,176,139.

(60) Provisional application No. 60/443,894, filed on Jan. 30, 2003, provisional application No. 60/432,472, filed on Dec. 11, 2002.

(51) Int. Cl.
*G06F 15/16* (2006.01)
*G06F 13/00* (2006.01)

(52) U.S. Cl.
USPC ............ 710/19; 710/15; 710/16; 710/17; 710/18; 709/208; 709/223; 709/224; 709/225

(58) Field of Classification Search
USPC ............ 710/15–19; 709/208, 223, 225, 224
See application file for complete search history.

(56) References Cited

U.S. PATENT DOCUMENTS

| | | | | |
|---|---|---|---|---|
| 5,914,656 A | * | 6/1999 | Ojala et al. | 340/521 |
| 6,005,861 A | * | 12/1999 | Humpleman | 370/352 |
| 6,275,865 B1 | * | 8/2001 | Zou | 719/313 |
| 6,363,434 B1 | * | 3/2002 | Eytchison | 719/313 |
| 6,446,192 B1 | * | 9/2002 | Narasimhan et al. | 712/29 |
| 6,812,715 B2 | * | 11/2004 | Chiozzi et al. | 324/691 |
| 6,924,727 B2 | * | 8/2005 | Nagaoka et al. | 340/3.1 |
| 7,237,029 B2 | * | 6/2007 | Hino et al. | 709/227 |
| 7,346,463 B2 | * | 3/2008 | Petite et al. | 702/62 |
| 7,397,363 B2 | * | 7/2008 | Joao | 340/539.11 |
| 7,477,644 B2 | * | 1/2009 | Georgiou et al. | 370/394 |
| 7,650,233 B2 | * | 1/2010 | Motoyama et al. | 701/484 |
| 2002/0188724 A1 | * | 12/2002 | Scott | 709/225 |
| 2004/0003051 A1 | * | 1/2004 | Krzyzanowski et al. | 709/217 |

* cited by examiner

*Primary Examiner* — Tammara Peyton
(74) *Attorney, Agent, or Firm* — Garlick & Markison; Randy W. Lacasse

(57) ABSTRACT

Methods are disclosed for automatically monitoring and controlling at least one media peripheral device in a media exchange network. A communication link is established between a media management system (MMS) and a media peripheral (MP) device in the media exchange network and an operation of the MP device is automatically selected via the MMS over the communication link. Finally, the operation of the MP device is automatically carried out (i.e., performed). Also, after establishing a communication link between a media management system (MMS) and a media peripheral (MP) device in the media exchange network, at least one status parameter of the MP device may be automatically monitored via the MMS over the communication link. The status parameter may be automatically stored and/or displayed via the MMS.

20 Claims, 14 Drawing Sheets

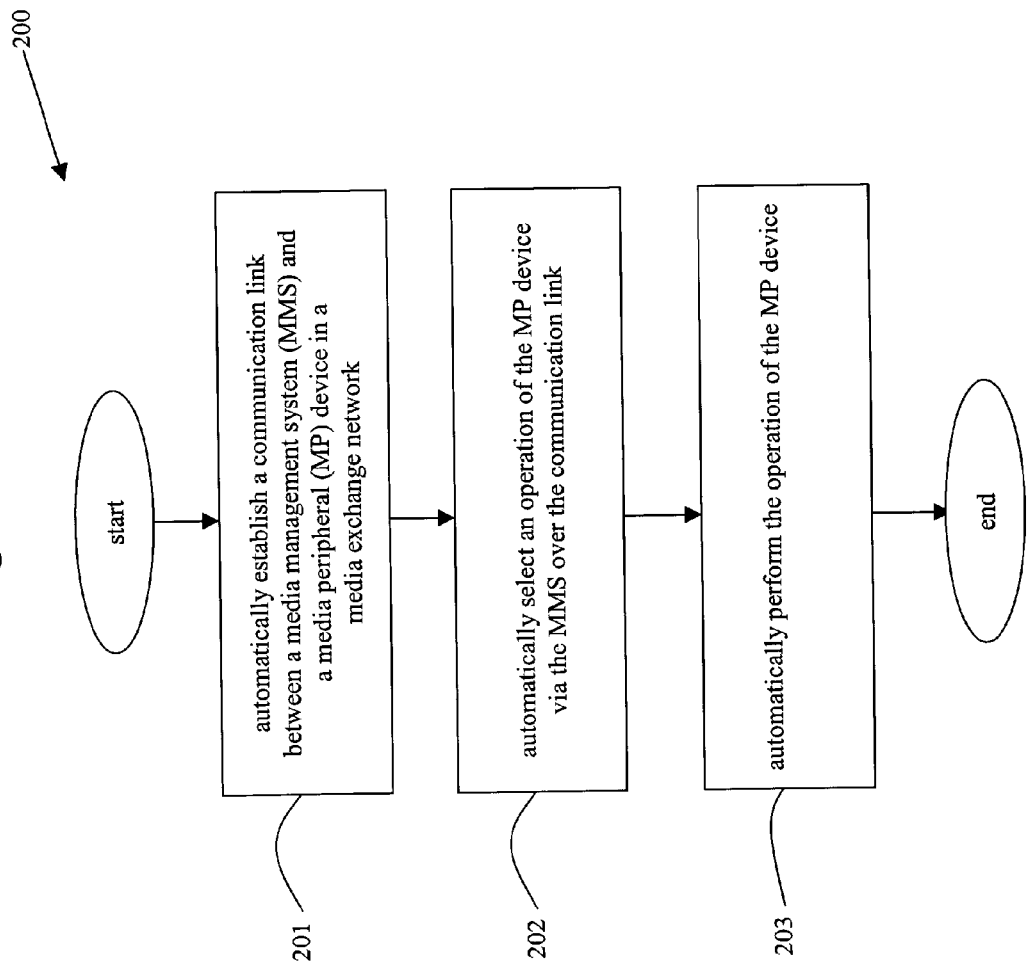

| CHANNEL LINE UP | <1PM | 2PM | ... | 6PM | 7PM>> |
|---|---|---|---|---|---|
| | | | HOUR, DAY | | |
| FAMILY VACATIONS | | | | | |
| KID's SPORTS | | | | | |
| ... | | | | | |
| VACATION in ALASKA VIDEO  802 | Normal Estimated Delivery Time: 2 hrs 13 min Cost: 59¢ (without Queuing) | | | Showing All Day (48 Min), Earliest Order Time: 4:00PM MPEG-2 1.5 Mbps | |
| VACATION in ALASKA VIDEO  803 | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO  804 | Overnight Delivery: Avail Nxt Morning Cost: 5¢ (Server Stored) | | | Showing All Day (48 Min), Earliest Order Time: 4:00PM MPEG-2 19 Mbps | |

AUTOMATIC ACCESS AND CONTROL OF MEDIA PERIPHERALS ON A MEDIA EXCHANGE NETWORK

CROSS-REFERENCE TO RELATED APPLICATIONS/INCORPORATION BY REFERENCE

This application is a continuation of Ser. No. 10/672,601, filed Sep. 26, 2003, now issued as U.S. Pat. No. 8,176,139, which makes reference to, claims priority to, and claims the benefit of U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of all of which are hereby incorporated herein by reference in their entirety.

In addition, this application makes reference to U.S. patent application Ser. No. 10/657,390, entitled "Personal Inter-Home Media Exchange Network", filed Sep. 8, 2003, now patented as U.S. Pat. No. 7,496,647, and U.S. patent application Ser. No. 10/660,267, entitled "Personal Access And Control Of Media Peripherals On A Media Exchange Network", filed Sep. 11, 2003, now U.S. Pat. No. 7,496,665, the complete subject matter of which are hereby incorporated herein by reference, in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Digital media devices may be battery powered, portable or mobile devices that are designed to operate while in motion ("roaming digital media devices"), or may be designed for operation while in a fixed location and usually connected to a power outlet ("stationary digital media devices"). Typical digital media devices, including media capture and player devices such as video and image cameras, audio recorders, and video, audio and image players, are designed for direct user control.

Direct control of such digital media devices occurs manually through buttons, switches and keypads on the digital media device or on an associated remote control device. With direct control, users have access to a wide set of device commands and trick modes, such as power on or off, play, rewind, capture, erase, delete, zoom, rewind, skip, sleep, standby, volume, brightness, modes, scan, etc. Direct access to media (for playback, review, etc.) in typical digital media devices is but one result of direct control.

Many of such digital media devices also use displays, light emitting diodes, and other visual components to assist the user in carrying out direct control. Audible or audio components are also often employed to assist.

Most digital media devices offer no means for indirect control, and, for those that do, the indirect control is very limited and difficult to use. Indirect control is control that is initiated from an independent device that may or may not be operated by a user. Independent devices do not include remote control devices that communicate directly with the digital media device (associated remote control devices).

A personal computer (PC) is an exemplary independent device that is often used to indirectly access media stored on a digital media device via a wired link. The indirect control of such digital media devices involves the: (1) exchange of media meta information, e.g., media file names, sizes, dates, resolution and format; (2) uploading of media to the digital media device; or (3) downloading of media from the digital media device. Through such indirect control, a user is able to extract media for printing, routing, or processing or load media for playback or review. Even so, the overall process for doing so is not easy.

For example, to route images to a friend, a user removes a digital camera from its case and through direct control turns on the power, adjusts settings and captures images. Afterwards, the user through direct control turns off the power and returns the camera to its case. Later, when within range of a PC, the user: (1) removes the digital camera from its case; (2) attaches a cable between the PC and the digital camera; (3) powers up the digital camera using direct control; (4) places the camera in a download mode using direct control; (5) runs a PC application that, using indirect control, copies the image files from the digital camera to the PC via the cable; (6) powers down the digital camera using direct control; (7) removes the cable; (8) places the camera into its case; (9) exits the PC application; (10) establishes an Internet connection; (11) runs an e-mail program on the PC; and (12) creates and sends an e-mail with the image files attached. This process is very tedious and time consuming, and, especially when problems arise, requires a fairly savvy user.

Occasionally, a user may want to determine certain statistics of a digital media device such as, for example, model number, software/firmware version, settings, and capabilities. As a result, the user may have to manually examine the digital media device or read through much of the user's manual of the digital media device. Also, in order to discover certain status information such as a battery charge level or a stored image status, for example, of a digital media device, a user may have to find, unpack, and examine the digital media device.

Many times, a user may quickly grab a digital media device such as, for example, a digital camera, only to discover that the digital camera is not ready to use because the charge of the battery pack is low. A user may have to keep a digital media device plugged into a wall socket while not using the digital media device to ensure that a battery pack of the digital media device is charged.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the present invention relate to automatically monitoring and controlling media peripheral devices on a media exchange network. As defined herein, a media peripheral device, also referred to as a "media peripheral", includes any device comprising a processor and media capture software and/or media player software. As defined herein, "automatic" and "automatically" mean without user intervention.

Aspects of the present invention may be found in a method for automatically controlling at least one media peripheral via a communication network. Such a method may comprise automatically identifying by a first system, at a first location, the at least one media peripheral communicatively coupled to at least one of the first system and a second system, the second system at a second location, and automatically establishing a communication link between the first system and the at least one media peripheral. The method may also comprise automatically requesting performance of a selected operation on the at least one media peripheral. In addition, such a method may comprise automatically determining authorization of the performance of the selected operation, and automatically performing the selected operation on the at least one media peripheral, if the authorization is successful. An embodiment of the present invention may automatically not perform the selected operation on the at least one media peripheral, if the authorization is not successful.

In various embodiments of the present invention, the at least one media peripheral may comprise one of a digital camera, a personal computer, a digital camcorder, a MP3 player, a mobile multi-media gateway, a home juke-box, and a personal digital assistant. The at least one media peripheral may comprise a processor running media capture software and/or media player software, and the communication link may be established via a wired connection, and the via a wireless connection.

In an embodiment in accordance with the present invention, the operation may comprise one of powering the at least one media peripheral on or off, scanning the at least one media peripheral in angle about at least one axis of rotation, and transferring stored media from the at least one media peripheral to at least one of the first system and the second system. In addition, the operation may comprise transferring stored media from at least one of the first system and second system to the at least one media peripheral, and transferring software from at least one of the first system and the second system to the media peripheral. The operation may also comprise initiating updating of status information of the at least one media peripheral, initiating a test of the at least one media peripheral, initiating a play mode of the at least one media peripheral, and initiating a stop mode of the at least one media peripheral.

In various embodiments of the present invention, the operation may comprise initiating a rewind mode of the at least one media peripheral, initiating a fast forward mode of the at least one media peripheral, and initiating a trick mode of the at least one media peripheral. The operation may also comprise determining whether the at least one media peripheral is within range of at least one of the first system and the second system, putting the at least one media peripheral into a sleep state, changing a resolution parameter of the at least one media peripheral, and changing a frame rate parameter of the at least one media peripheral.

In various embodiments in accordance with the present invention, the at least one media peripheral may be co-located with respect to the first system, and in others the at least one media peripheral may be co-located with respect to the second system. In various embodiments of the present invention, at least one of the first system and the second system may comprise a set-top-box based media processing system, a personal computer based media processing system, and a television based media processing system. The establishing, the selecting, and the performing may be accomplished periodically over time, and the establishing, the selecting, and the performing may be accomplished at one or more pre-designated times. Establishing the communication link may be automatically initiated by the first system, and establishing the communication link may be automatically initiated by the at least one media peripheral.

Aspects of the present invention may also be observed in a method for automatically monitoring at least one media peripheral via a communication network. Such a method may comprise automatically identifying by a first system, at a first location, the at least one media peripheral communicatively coupled to at least one of the first system and a second system, the second system at a second location. The method may also comprise automatically establishing a communication link between the first system and the at least one media peripheral. An embodiment of the present invention may comprise automatically determining authorization for monitoring of the at least one media peripheral, and automatically monitoring, by the first system, at least one status parameter of the at least one media peripheral, if the authorization is successful. In addition, the method may comprise automatically responding, by the first system, to a state of the at least one status parameter, if the authorization is successful, and automatically not monitoring and not responding to a state of the at least one status parameter, if the authorization is not successful.

In various embodiments of the present invention, the at least one media peripheral may comprise one of a digital camera, a personal computer, a digital camcorder, a MP3 player, a mobile multi-media gateway, a home juke-box, and a personal digital assistant. The at least one media peripheral may comprise a processor running at least one of media capture software and media player software, and the communication link may be established via a wired connection and a wireless connection. In various embodiments in accordance with the present invention, the at least one status parameter may comprise a battery level, an "on/off" indication, an amount of storage used, an amount of storage remaining, a "within range" indication, a software version, a model number, a serial number, and a certificate ID. The at least one media peripheral may also be co-located with respect to the first system and with respect to the second system.

In various embodiments of the present invention, at least one of the first system and the second system may comprise a set-top-box based media processing system, a personal computer based media processing system, and a television based media processing system. The establishing, the monitoring, and the responding may be accomplished periodically over time, and may be accomplished at one or more pre-designated times. The responding may comprise at least one of storing the state of the at least one status parameter and displaying the state of the at least one status parameter. Establishing the communication link may be automatically initiated by the first system, and may be automatically initiated by the at least one media peripheral.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2A is a flowchart illustrating an embodiment of a method for automatically controlling a media peripheral device on the media exchange network of FIG. 1, in accordance with various aspects of the present invention.

FIG. 8 is an exemplary illustration of a media guide user interface showing several options of a pushed media in accordance with an embodiment of the present invention.

DETAILED DESCRIPTION OF THE INVENTION

Figure 1:
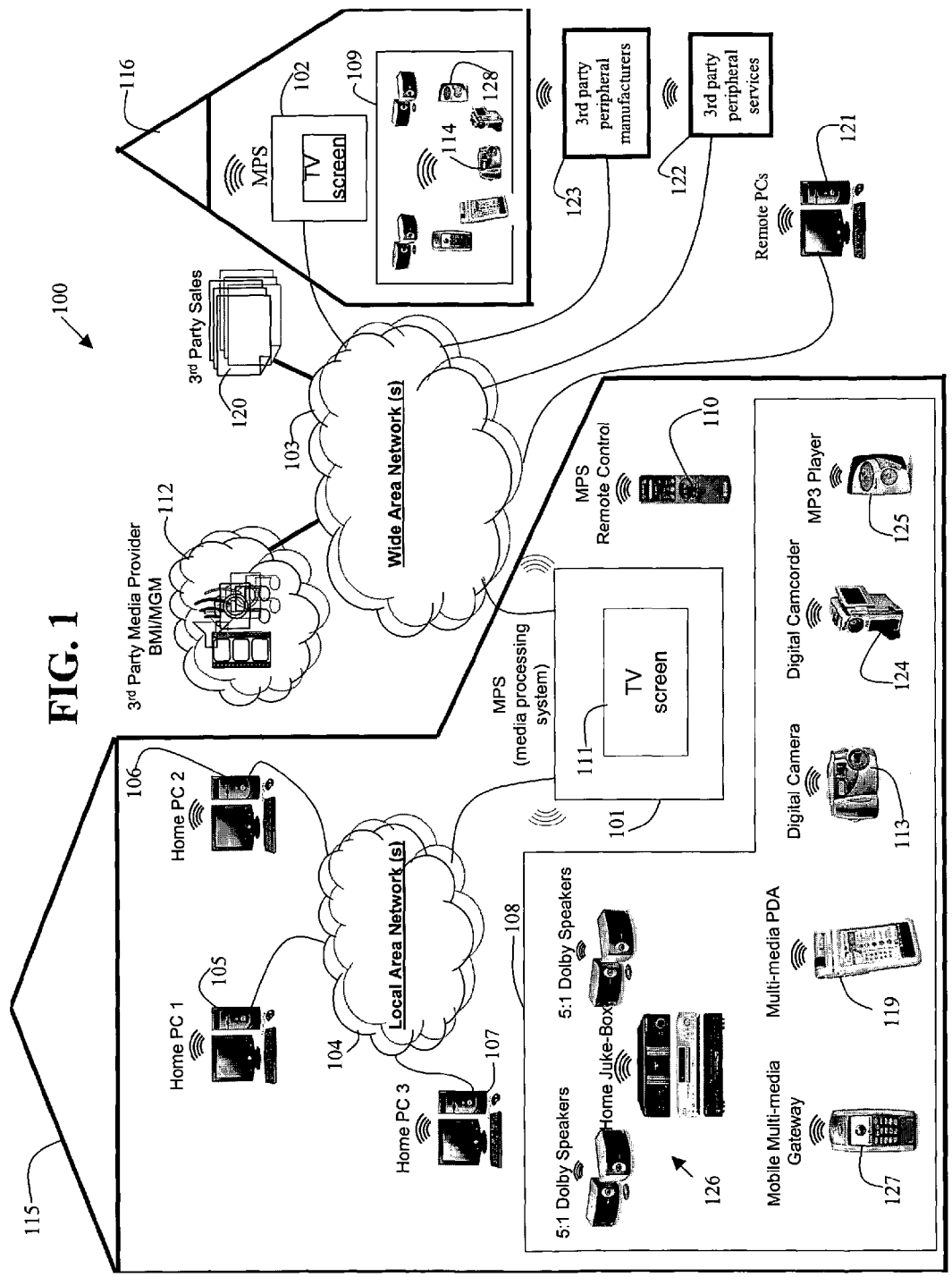
FIG. 1 is a diagram illustrating an embodiment of a media exchange network supporting automatic access, monitoring, and control of media peripheral devices, in accordance with various aspects of the present invention.

FIG. 1 is a diagram illustrating an embodiment of a media exchange network 100 supporting access, monitoring, and control of media peripheral devices (e.g., 108 and 109), in accordance with various aspects of the present invention. Specifically, the media exchange network 100 is a communication network comprising a first MPS (media processing system) 101 located in a home location 115 of the media exchange network 100, a second MPS 102 at a remote location 116, WAN(s) ("Wide Area Network(s)") 103, and LAN(s) ("Local Area Network(s)") 104. The MPS 101 may interface wirelessly or via a wired connection to both LAN(s) 104 and WAN(s) 103. Similarly, MPS 102 may interface wirelessly or via a wired connection to WAN(s) 103. Remote location 116 may be, for example, a user's second home, a friend's home, or a family member's home.

The media exchange network 100 also includes several PCs ("personal computers") 105, 106, and 107 in the home location 115 of the media exchange network 100 that interface wirelessly or via a wired connection to the LAN(s) 104. The PC's may comprise desktop PC's, notebook PC's, PDA's, or any computing device. The media exchange network 100 further comprises a first plurality of media peripheral devices 108 at the home location 115, and a second plurality of media peripheral devices 109 at the remote location 116. The first plurality of media peripheral devices 108 may interface wirelessly or via a wired connection to the MPS 101 in any combination. Similarly, the second plurality of media peripheral devices 109 may interface wirelessly or via a wired connection to the MPS 102 in any combination.

The media peripheral devices (108, 109) may include a digital camera 113, a digital camcorder 124, a MP3 player 125, a home juke-box system 126, a multi-media PDA (personal digital assistant) 119, and a mobile multi-media gateway device 127. The MPS's (101, 102) may include a TV screen 111 for viewing various types of media.

Furthermore, the media exchange network 100 comprises a $3^{rd}$ party media provider(s) 112, a $3^{rd}$ party sales provider(s) 120, a remote computer(s) 121, a $3^{rd}$ party peripheral service(s) 122, and a $3^{rd}$ party peripheral manufacturer(s) 123 all interfacing wirelessly or via a wired connection to the WAN(s) 103.

The LAN(s) 104 may comprise, for example, a home cable infrastructure, an Ethernet infrastructure, an 802.11b wireless infrastructure, or a home PNA (phoneline networking alliance) infrastructure, providing peer-to-peer networking capability within the home location 115.

The WAN(s) 103 may include cable infrastructure, DSL infrastructure, Internet infrastructure, or intranet infrastructure in order to provide communications between, for example, the home location 115, the remote location 116, and third party locations 112, 120, 121, 122, 123.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, networking functionality, and automatic control and monitoring of media peripheral devices. For example, a MMS may provide automatic control of media peripheral devices, automatic status monitoring of media peripheral devices, and inter-home MPS routing selection, in accordance with an embodiment of the present invention. An MPS is also known, herein, as a media-box and/or an M-box.

Any of the PC's (105, 106, 107, 121) may indirectly access and control any of the plurality of media peripheral devices (108, 109) if the PC's include a MMS. Such access and control may be accomplished in communication pathways via the MPS's (101, 102) or outside of the MPS's (101, 102). Similarly, any of the MPS's (101, 102) may automatically access and control any of the media peripheral devices (108, 109) without user interaction.

Today, TV is typically only used for media consumption, not to control media peripheral devices without performing media consumption. An MPS may or may not be the beneficiary or initiator of media peripheral device controls.

There are many types of indirect control commands available to manipulate the various media peripheral devices. Each media peripheral device may have particular indirect commands unique to that device or type of device. Many of the indirect commands will find parallels to the available direct commands. Exemplary commands include turning media peripheral devices 108 and/or 109 on and off, initiating play, stop, capture, erase/delete, zoom, rewind, fast forward, scan, list, skip, upload, download, test, poll, sleep, etc.

Media peripheral devices may be controlled and monitored automatically via a MMS on the media exchange network 100. Such control and monitoring may be local (i.e., the media peripheral devices are co-located with respect to the MMS) or remote (i.e., the media peripheral devices are located remotely with respect to the MMS).

FIG. 2A is a flowchart illustrating an embodiment of a method 200 for automatically controlling a media peripheral device on the media exchange network 100 of FIG. 1, in accordance with various aspects of the present invention. In step 201, a communication link is automatically established between a media management system (MMS) and a media peripheral (MP) device in a media exchange network. In step 202, an operation of the MPS device is automatically selected via the MMS over the communication link. In step 203, the selected operation of the MP device is automatically carried out. The method 200 may be performed on a periodic basis or at a pre-designated time, in accordance with various aspects of the present invention.

The automatic management of memory, such as evaluating how much memory storage space is left in a media peripheral device or moving and migrating media files, may be automatically controlled using certain media peripheral device commands. As an example, a digital camera 113 may be placed on a table in the home location 115. The MPS 101 may automatically establish a communication link and command the digital camera 113 to turn on at noon on Thursdays, for example. The command may be communicated to digital camera 113 wirelessly from the MPS 101. Next, the MPS 101 may automatically initiate another command to the digital camera 113, in a similar manner, instructing the digital camera 113 to download image files from the digital camera 113 to the MPS 101. In such an example, the MMS of the MPS 101 may have been previously programmed by a user for the described process to occur at noon on Thursdays. Also, in such an example, the MPS 101 and the digital camera 113 are co-located within the home location 115. Alternatively, a MP device may automatically initiate communication with an MPS when the storage used of the MP device reaches a certain level.

As yet another example, the PC 105 may automatically establish a communication link and command the digital camera 113 to power on. The command may be communicated wirelessly from the PC 105 to LAN(s) 104, and then through a wired connection from LAN(s) 104 to the MPS 101. Finally, the command may be communicated wirelessly from the MPS 101 to the digital camera 113. Next, the PC 105 may automatically initiate another command to the digital camera 113, in a similar manner, instructing the digital camera 113 to download image files from the digital camera 113 to the MPS 101. Finally, the PC 105 may automatically initiate a third command to the MPS 101 via LAN(s) 104, instructing the MPS 101 to display the pictures in the image files on the TV screen 111. In such an example, the PC 105 includes a MMS and is essentially an MPS.

The digital camera 114 may have been left on a table at the remote location 116, pointing out a window. The MPS 101 at the home location 115 may automatically establish a communication link between the digital camera 114, via the WAN 103 and the MPS 102, and command the digital camera 114 to power on. The power-on command may be communicated from the MPS 101 to the WAN(s) 103 via a wired connection, and then from the WAN(s) 103 to the MPS 102 via a wired connection. Finally, the command may be communicated from the MPS 102 to the digital camera 114 via a wireless connection. Next, the MPS 101 may automatically initiate another command, in a similar manner, to direct the digital camera 114 to take pictures at the remote location 116. In such an example, the process may have been pre-programmed ahead of time by a user of the MPS 101.

As yet another example, the MPS 102 may automatically command the digital camera 113 to turn on and download image files to the MPS 102. The commands may be communicated from the MPS 102 to the WAN(s) 103 via a wireless connection, and then from the WAN(s) 103 to the MPS 101 via a wired connection, and finally from the MPS 101 to the digital camera 113 via a wired connection.

As another example of automatic indirect control, the MPS 101 may automatically command the home juke-box system 126 to power on via a wireless connection at the pre-designated time of 9:00 p.m. on Saturday night. Next, the MPS 101 commands the home juke-box system 126 to download a music file in a first format to the MPS 101. The command is accomplished over the wireless connection between the MPS 101 and the home juke-box system 126. The MPS 101 automatically converts the music file from the first format to a second MP3 format and then the MPS 101 commands that the MP3 player 125 at home location 115 and an MP3 player 128 at remote location 116 both be powered on. The command from the MPS 101 to the MP3 player 125 may be communicated via a wireless connection. The command from the MPS 101 to the MP3 player 128 at remote location 116 may be communicated first from the MPS 101 to the WAN(s) 103 via a wired connection, and then from the WAN(s) 103 to the MPS 102 via a wired connection, and finally from the MPS 102 to the MP3 player 128 at the remote location 116 via a wireless connection. As a result, the MPS 101 may follow up by automatically downloading the music file in the second MP3 format to the MP3 player 125 at the home location 115 and to the MP3 player 128 at the remote location 116.

Certain media peripheral commands may be automatically initiated by a MMS to perform feature interrogation such that statistics (stats) of a media peripheral may be automatically accessed (e.g., camera resolution, version number, model number, serial number, registration information, etc.). Also, a media delivery format such as a compression format, resolution, quality, frame rate, etc., may be automatically controlled. For example, the MPS 101 may automatically initiate a command to the digital camcorder 124 for the digital camcorder 124 to power on. Next, the MPS 101 may automatically command the digital camcorder 124 to deliver a stats file to the MPS 101. The commands may be communicated via a wireless connection.

Figure 2B:
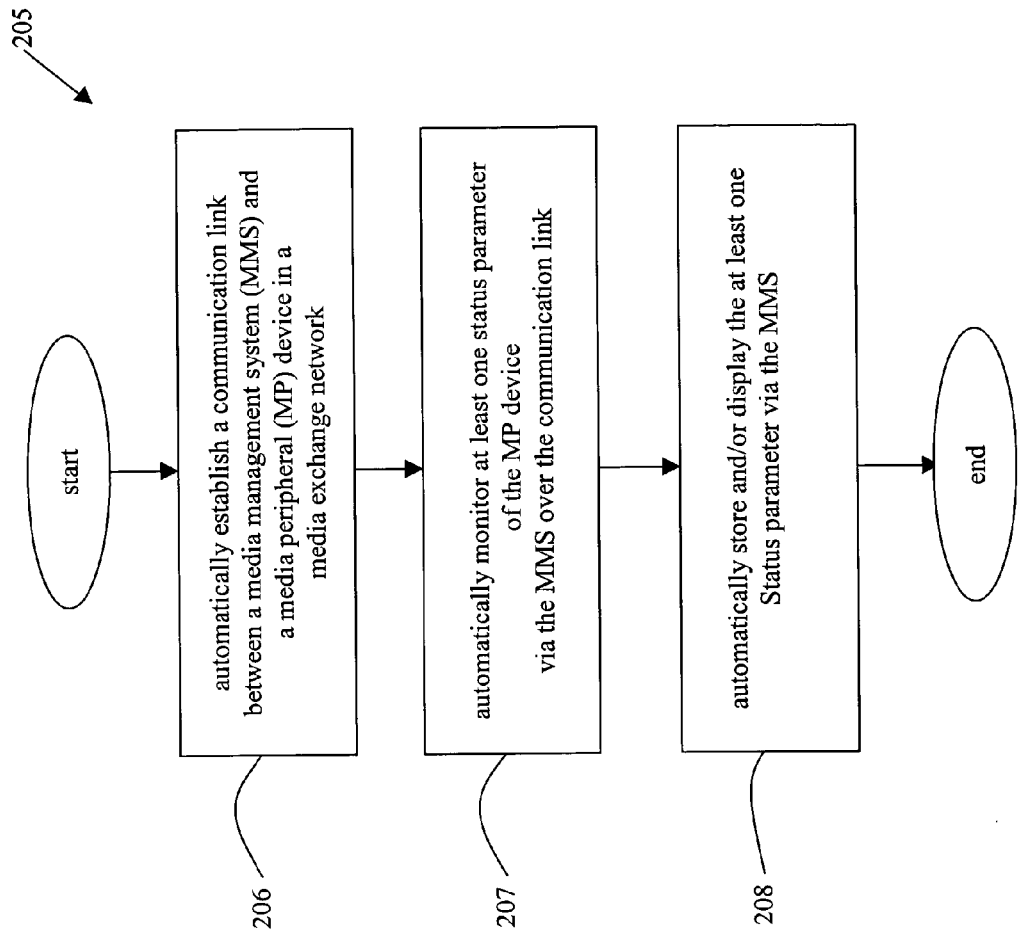
FIG. 2B is a flowchart illustrating an embodiment of a method for automatically monitoring status information of a media peripheral device on the media exchange network of FIG. 1, in accordance with various aspects of the present invention.

FIG. 2B is a flowchart illustrating an embodiment of a method 205 for automatically monitoring status information of a media peripheral device on the media exchange network 100 of FIG. 1, in accordance with various aspects of the present invention. In step 206, a communication link is automatically established between a media management system (MMS) and a media peripheral device (MP) in a media exchange network. In step 207, at least one status parameter of the MP device is automatically monitored via the MMS over the communication link. In step 208, the at least one status parameter is automatically stored and/or displayed via the MMS.

As an example, the MPS 101 automatically establishes a communication link (e.g., a wireless connection) with the home juke-box system 126 and automatically initiates sending of a status access command to the home juke-box system 126 over the wireless connection. The home juke-box system 126 responds to the status access command by sending status information back to the MPS 101. The status information may include, for example, a "power on/off state", "storage used", "storage left", and "a within range indication" for the home juke-box system 126. The status information may be stored in the MPS 101, for example, and/or displayed by the MPS 101, for example.

"Power on/off" indicates the power state of the media peripheral device (i.e., ON or OFF). "Storage used" refers to the percent of total digital storage space that has been used in the media peripheral device. "Storage left" refers to the percent of total digital storage space remaining (i.e., unused) in the media peripheral device. Finally, "within range" refers to whether or not a communication link may be established between the media peripheral device and the polling device (e.g., MPS or PC) in the first place. The polling device (e.g., the MPS 101) is the device that is trying to access the status information from the media peripheral device (e.g., the home juke-box 126).

As another example, the MPS 102 at the remote location 116 automatically establishes a communication link with the MP3 player 125. The MPS 102 automatically monitors the MP3 player 125 by initiating sending of a status access command to the MP3 player 125 at the home location 115. The status access command is transmitted over a wired connection to the WAN 103, then to the MPS 101, and finally over a wireless connection to the MP3 player 125. The MP3 player 125 responds to the status access command by sending status information back to the MPS 102. The status information may include, for example, a power on/off state, a battery level, storage used, storage left, and a within range indication for the MP3 player 125. "Battery level" refers to the percent of full charge remaining on the battery or power pack of the media peripheral device (e.g., the MP3 player 125).

Figure 2C:
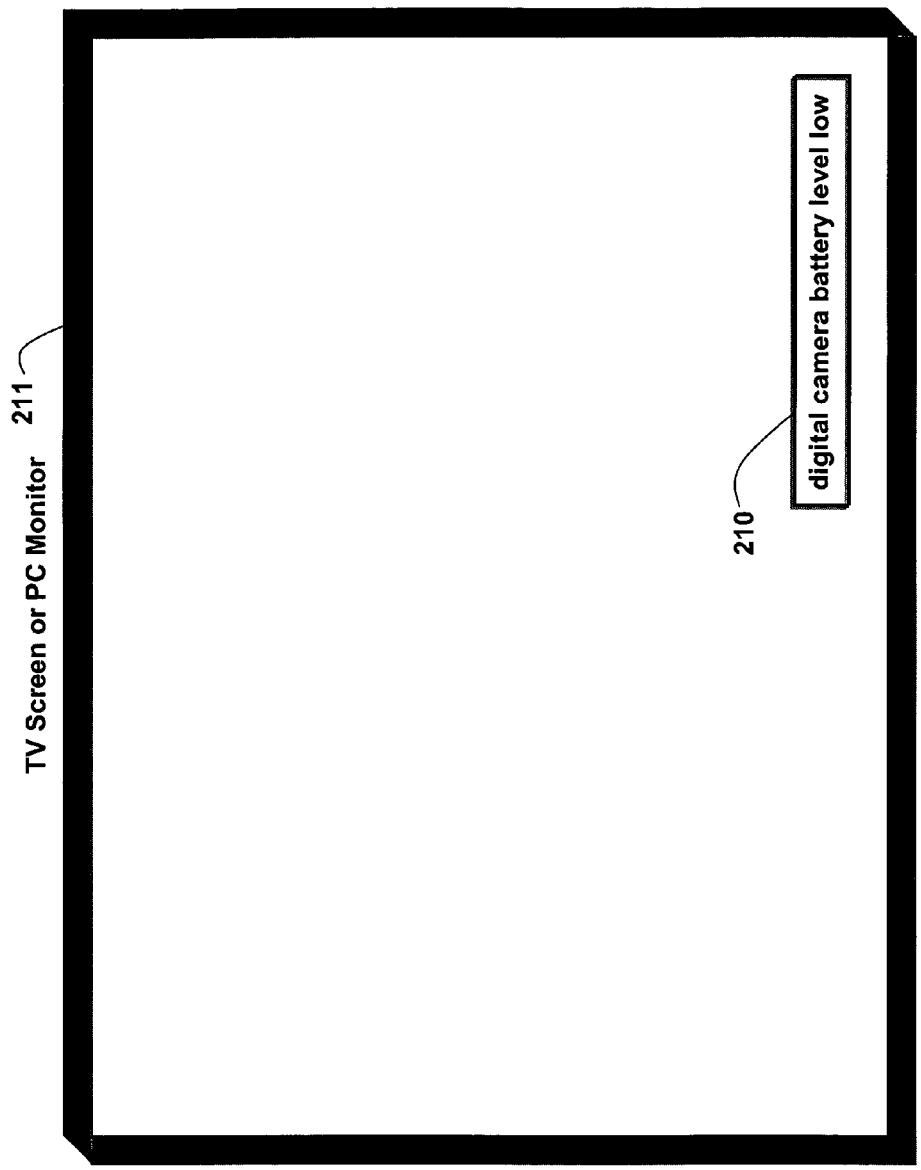
FIG. 2C is a diagram illustrating an embodiment of a displayed pop-up status message of a media peripheral device on the media exchange network of FIG. 1, in accordance with various aspects of the present invention.

FIG. 2C is a diagram illustrating an embodiment of a displayed pop-up status message 210 of a media peripheral device on a TV screen or PC monitor 211 on the media exchange network 100 of FIG. 1, in accordance with various aspects of the present invention. An MPS on the media exchange network 100 may monitor the status of various media peripheral devices on the media exchange network 100 on a periodic basis, for example. For example, periodically (e.g., once a day), the MPS 101 at the home location 115 may automatically poll the multi-media PDA 119 for "battery level" status. If the battery level charge of the multi-media PDA is below a certain level, the MPS 101 may respond by automatically storing the information and/or displaying a pop-up message 210 on the TV screen 111 to alert a user of the multi-media PDA to the "low charge" condition. Alternatively, a MP device may automatically initiate communication with a MPS when the battery level of the MP device drops below a certain level.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
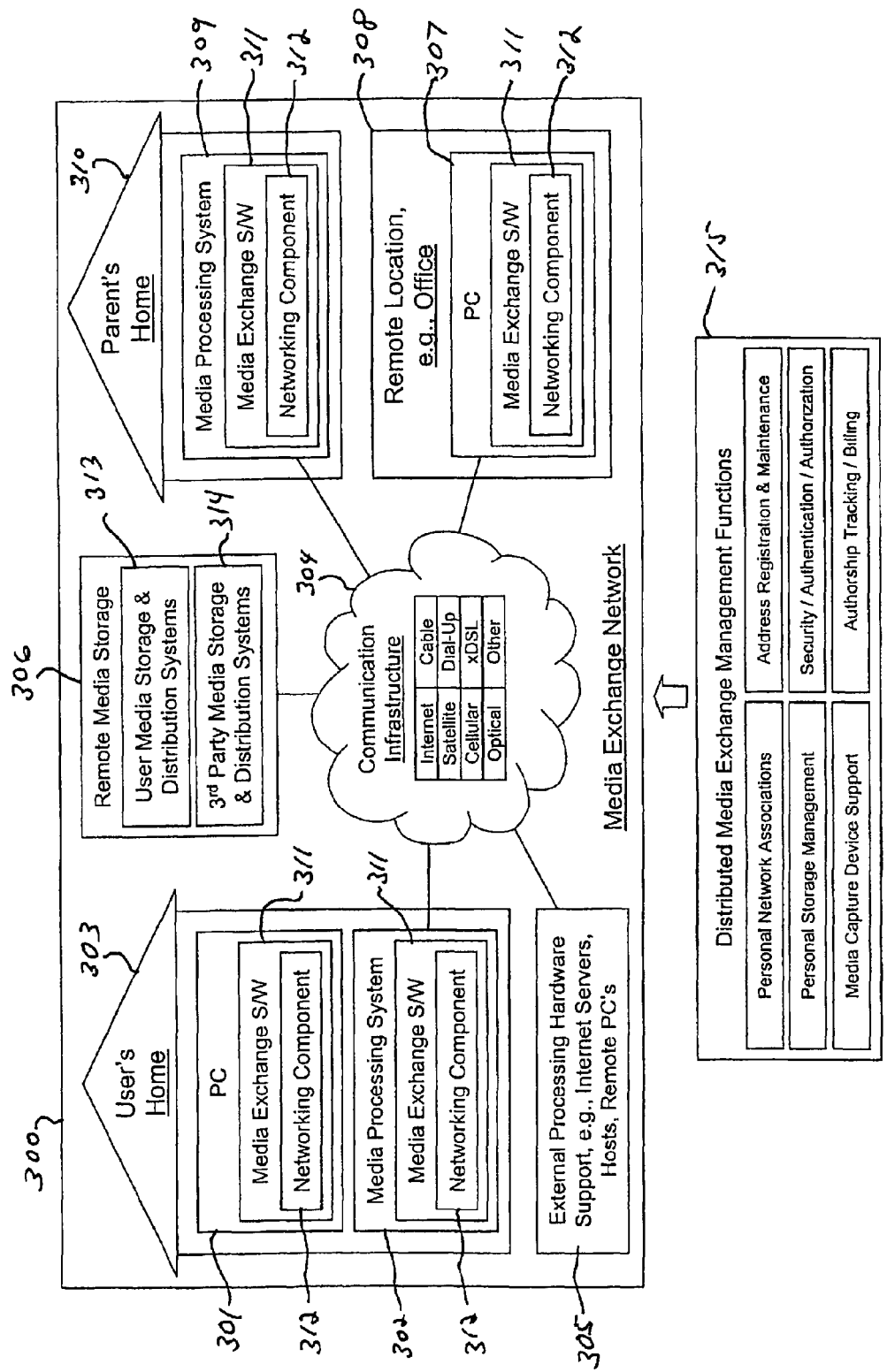
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
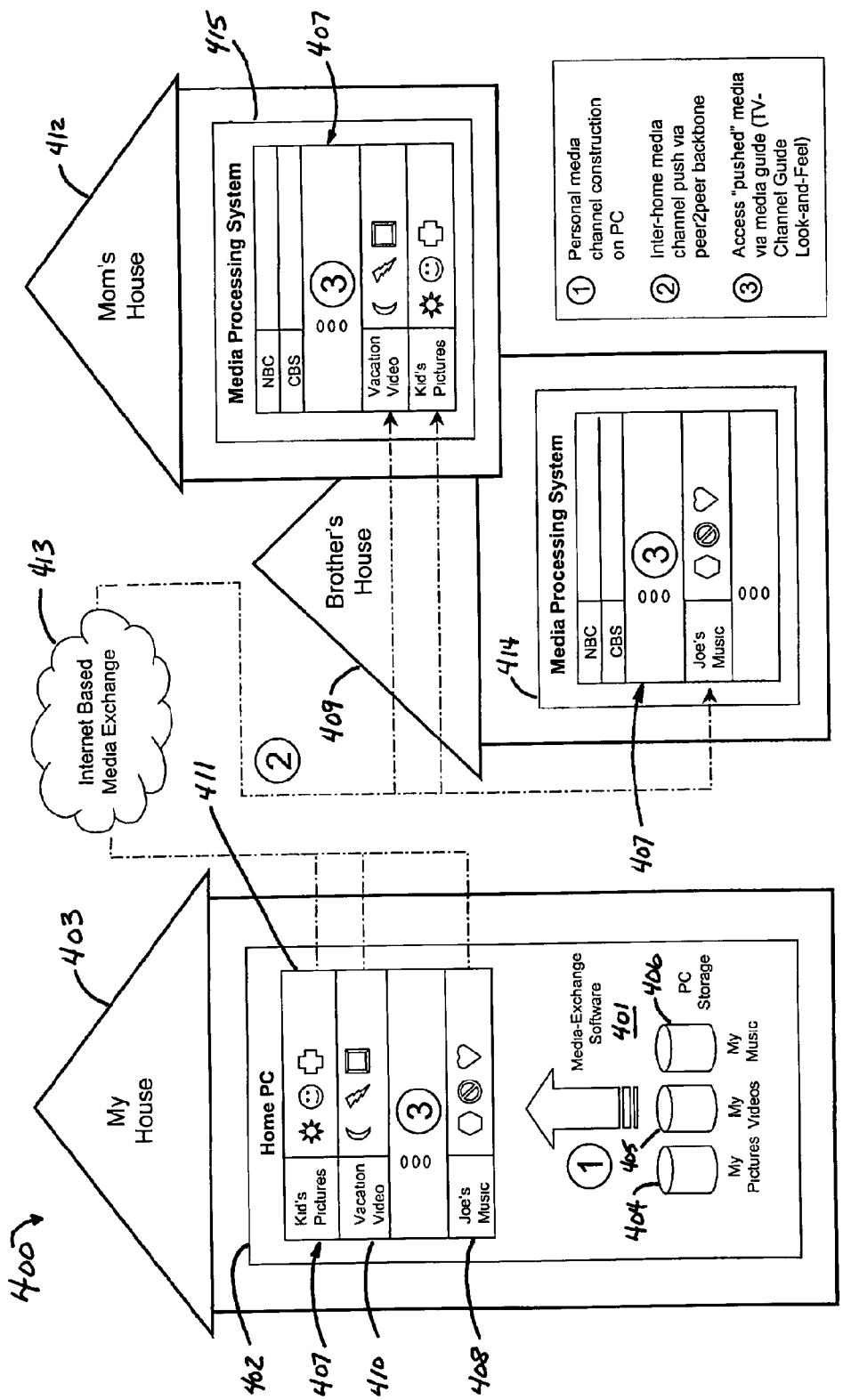
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
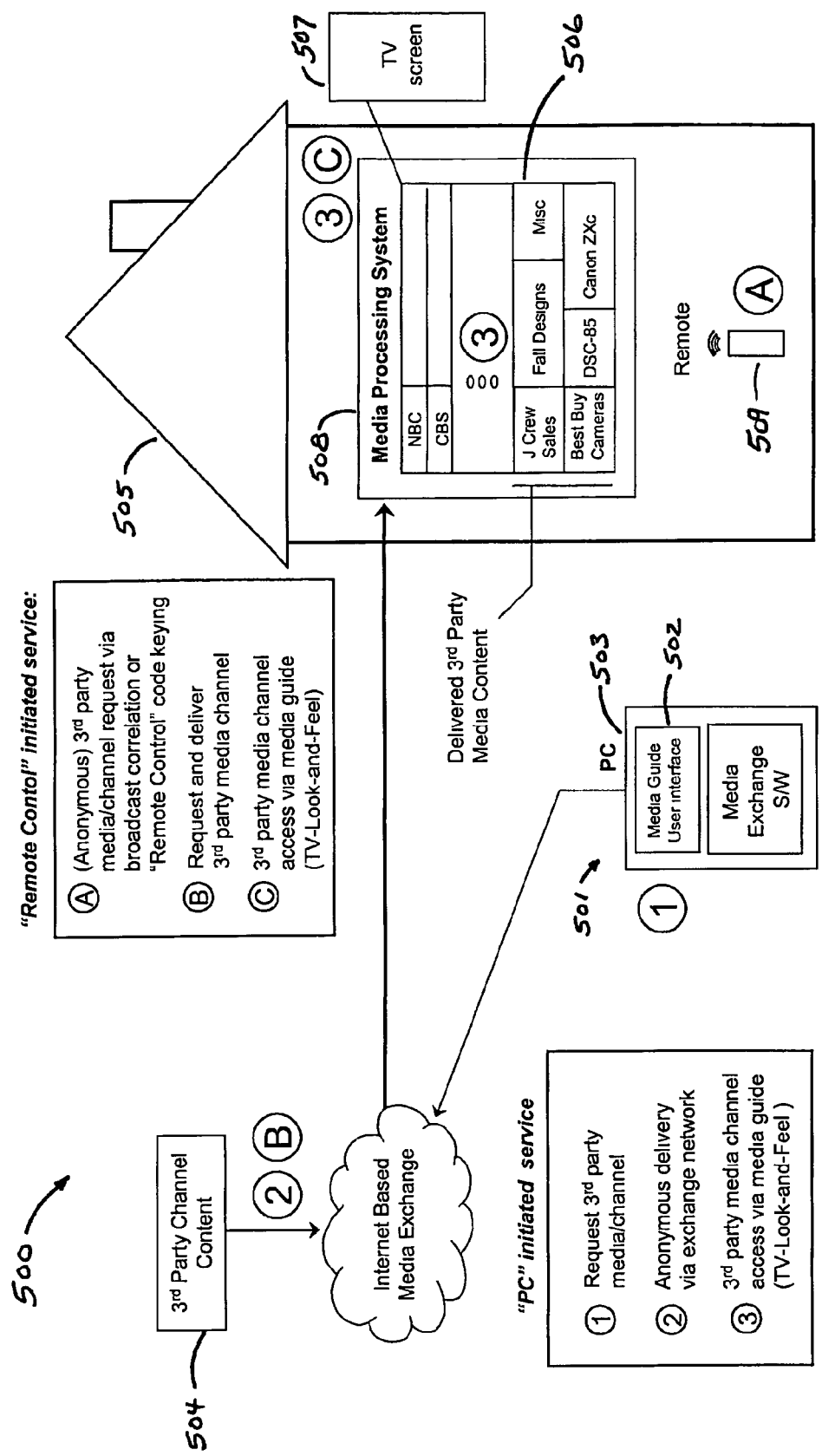
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
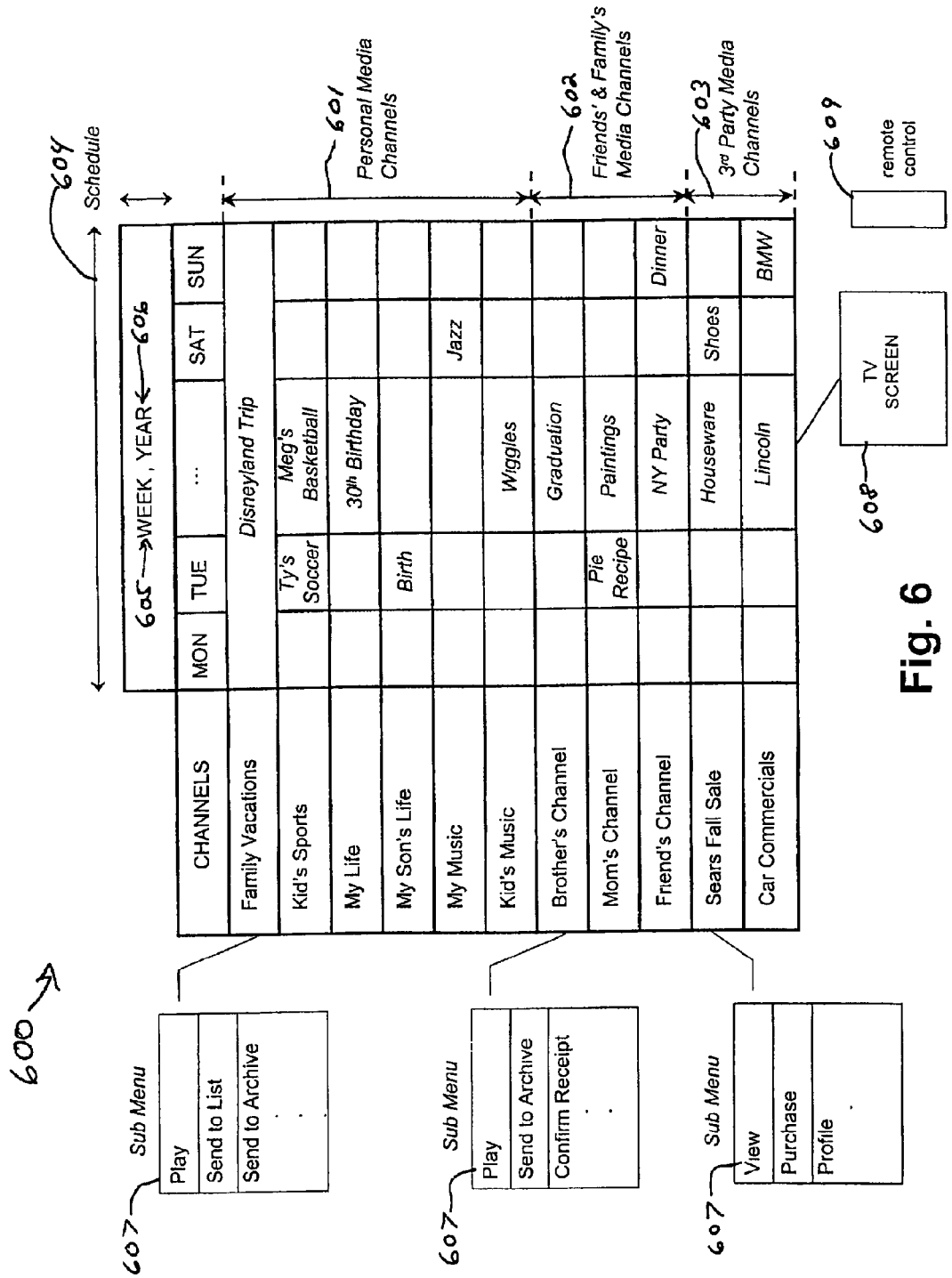
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
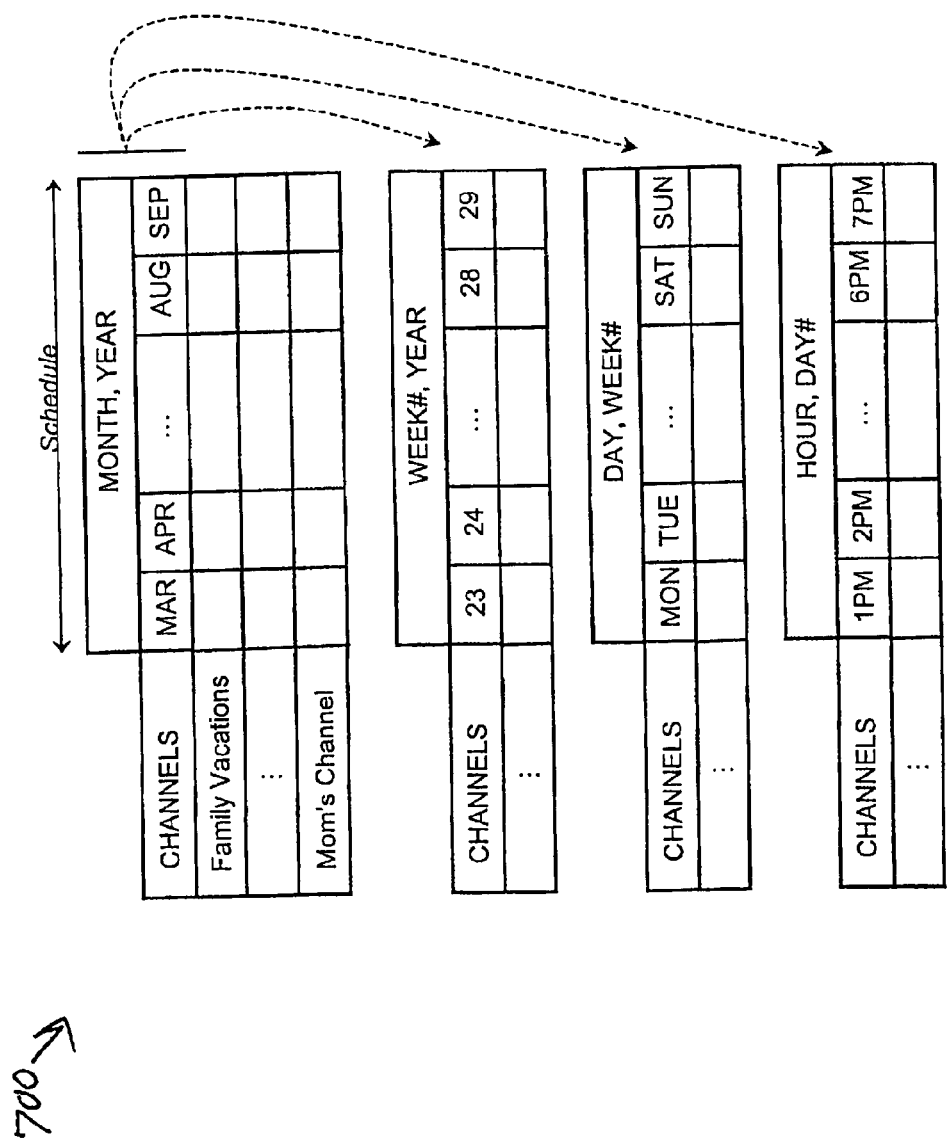
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
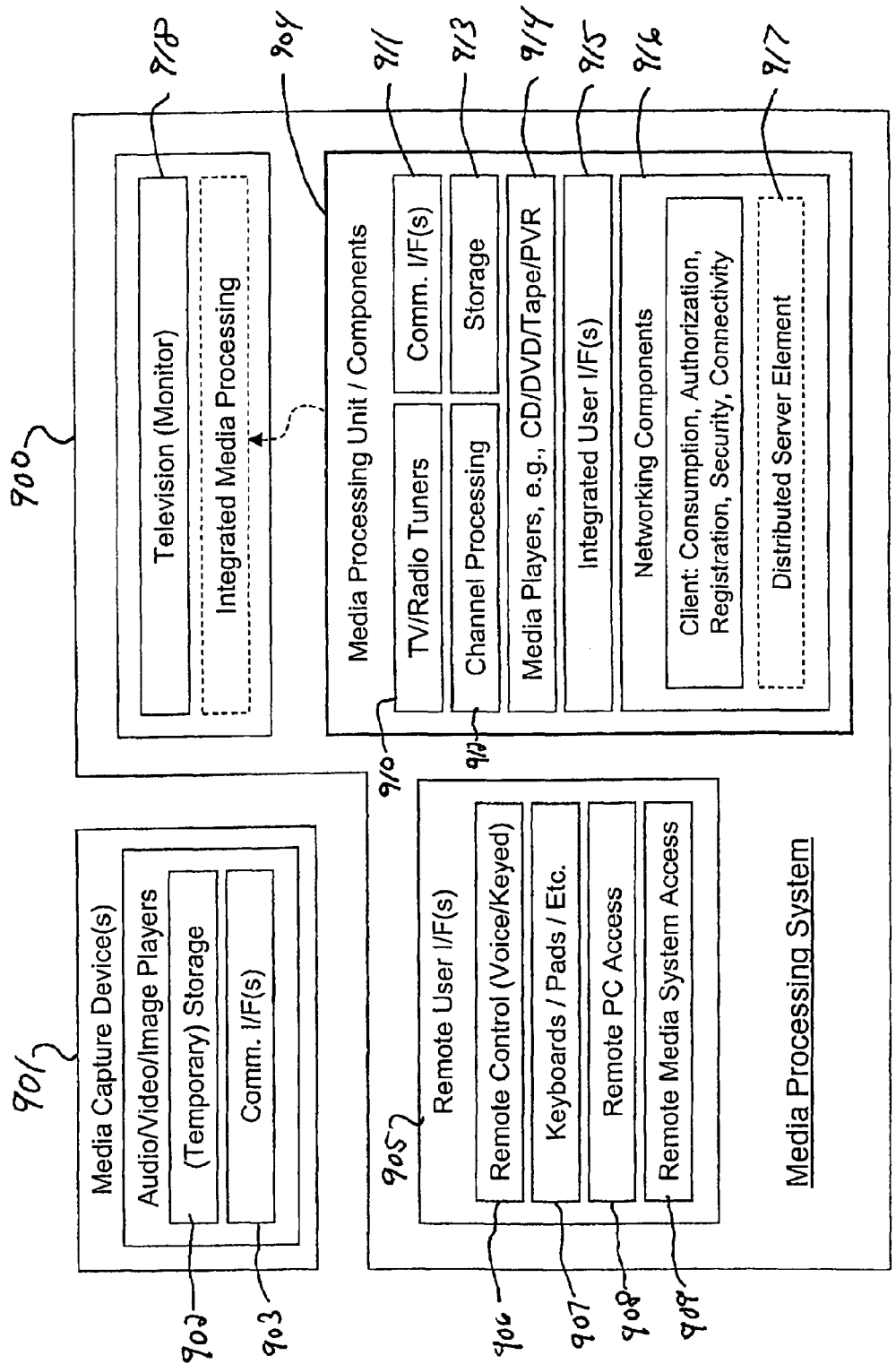
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
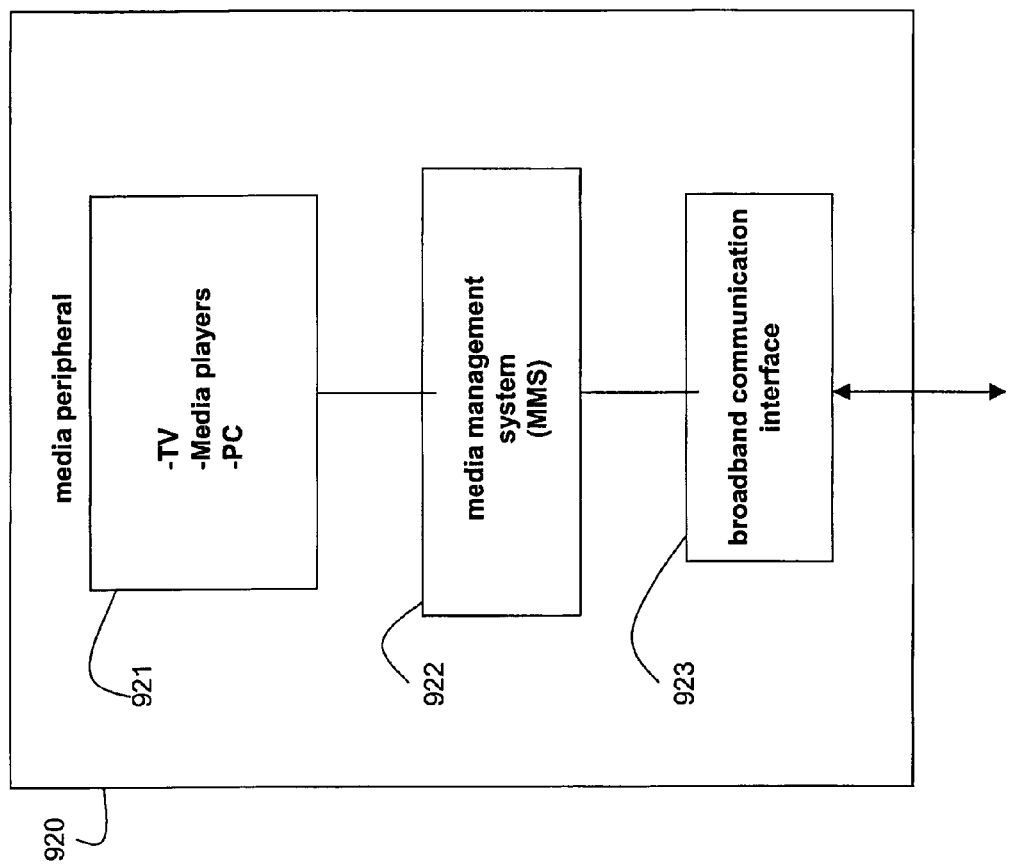
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite head end.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
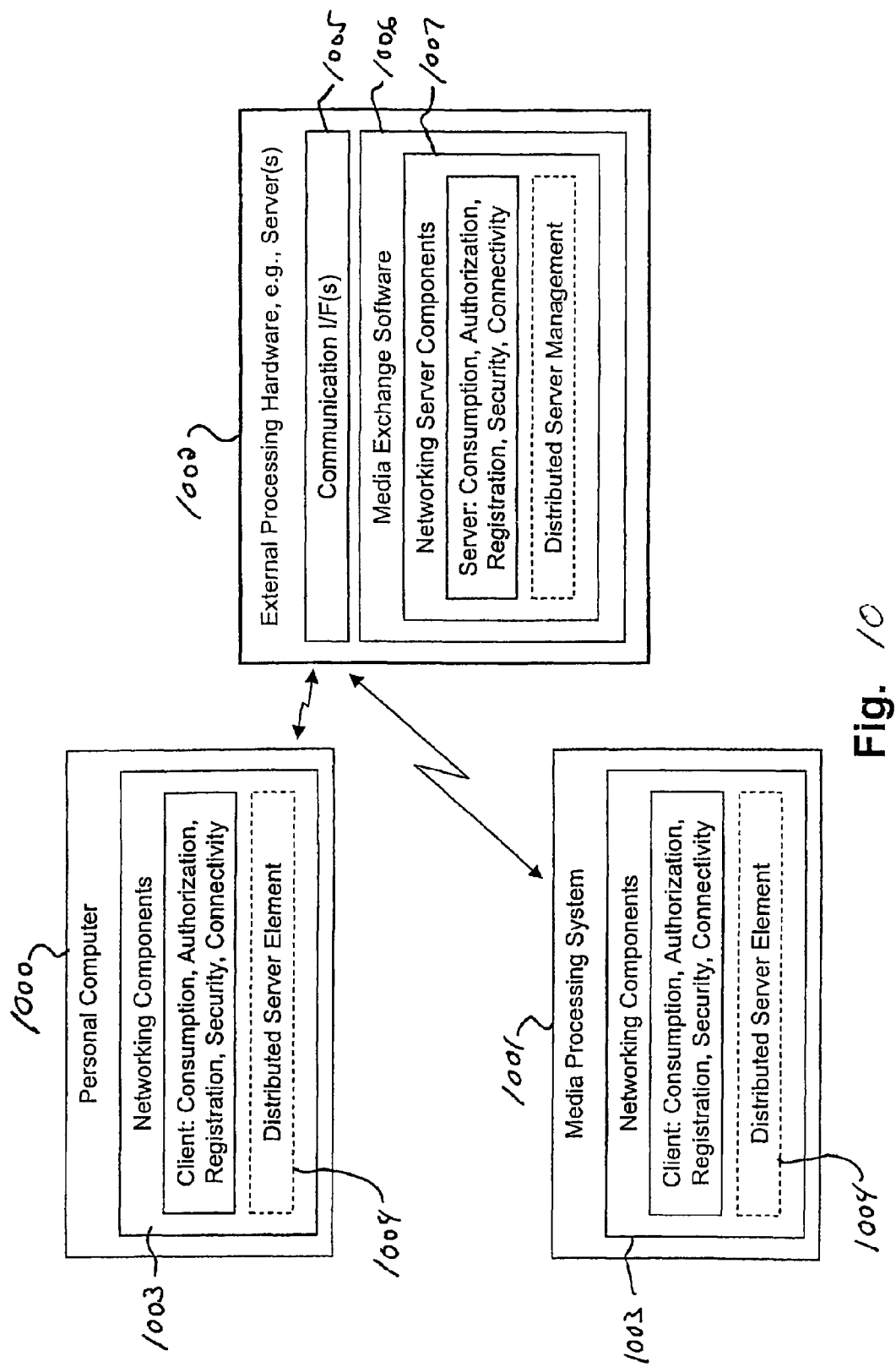
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
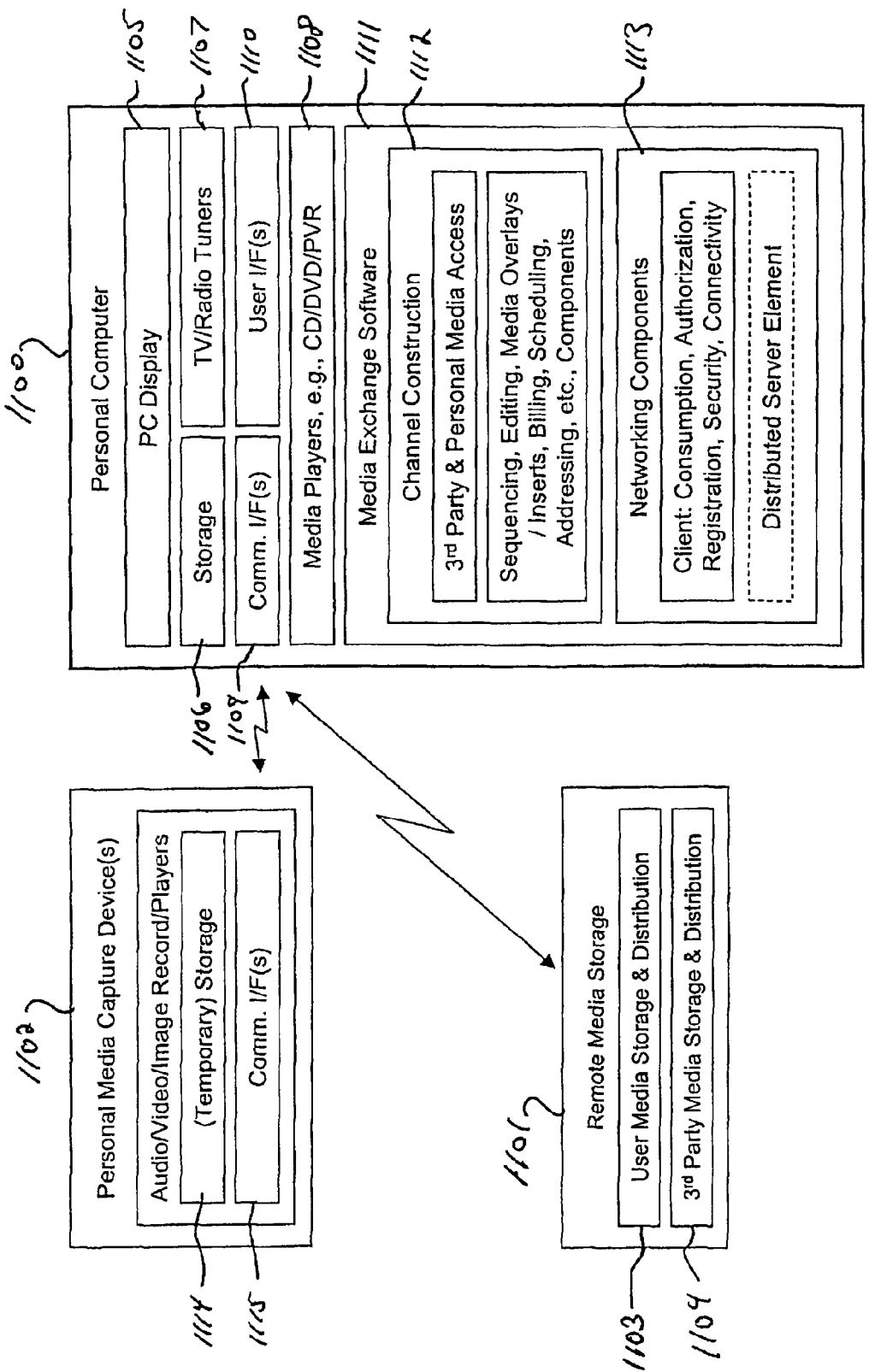
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connects to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Various embodiments of the present invention include a system and method that provide automatic access and control of media peripheral devices in a manner not previously accomplished. Certain embodiments of the present invention relate to various types of media peripheral device control and access, and various sources of initiation of media peripheral device control and access.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
  automatically identifying by a first system, at a first location, at least one media peripheral communicatively coupled to one or both of the first system and/or a second system, the second system at a second location;
  automatically establishing a communication link between the first system and the at least one media peripheral;
  automatically attempting to authorize for status monitoring, the at least one media peripheral by the first system; and
  upon successful authorization for status monitoring:
    automatically monitoring, by the first system, a plurality of status parameters of the at least one media peripheral that comprise at least two of a battery level, an "on/off" indication, an amount of storage used, and an amount of storage remaining; and automatically responding, by the first system, to a state of the plurality of status parameters.

2. The method of claim 1, wherein the at least one media peripheral comprises one of a digital camera, a personal computer, a digital camcorder, a MP3 player, a mobile multimedia gateway, a home juke-box, and a personal digital assistant.

3. The method of claim 1, wherein the at least one media peripheral comprises a processor running at least one of media capture software and media player software.

4. The method of claim 1, wherein the plurality of status parameters further comprises a "within range" indication, a software version, a model number, a serial number, and a certificate ID.

5. The method of claim 1, wherein the at least one media peripheral is co-located with respect to the first system.

6. The method of claim 1, wherein the at least one media peripheral is co-located with respect to the second system.

7. The method of claim 1, wherein at least one of the first system and the second system comprises one of: a set-top-box based media processing system, a personal computer based media processing system, and a television based media processing system.

8. The method of claim 1, wherein the establishing, the monitoring, and the responding are accomplished at one or both of periodically over time and at one or more pre-designated times.

9. The method of claim 1, wherein the responding comprises at least one of storing the state of at least one status parameter of the plurality of status parameters and displaying the state of the at least one status parameter of the plurality of status parameters.

10. The method of claim 1, wherein the establishing the communication link is automatically initiated by one or more of the first system, the second system, and at least one media peripheral.

11. A media processing system comprising:
at least one processor; and a network interface coupled to the at least one processing, the at least one processor and the network interface comprising a first system at a first location and operable to:
identify at least one media peripheral communicatively coupled to one or both of the first system and/or a second system, the second system at a second location;
automatically establish a communication link with the at least one media peripheral;
automatically attempt to authorize for status monitoring, the at least one media peripheral; and
upon successful authorization for status monitoring:
automatically monitor a plurality of status parameters of the at least one media peripheral that comprise at least two of a battery level, an "on/off" indication, an amount of storage used, and an amount of storage remaining; and
automatically respond to a state of the plurality of status parameters.

12. The media processing system of claim 11, wherein the at least one media peripheral comprises a processor running at least one of media capture software and media player software.

13. The media processing system of claim 11, wherein the plurality of status parameters further comprises at least one of a "within range" indication, a software version, a model number, a serial number, and a certificate ID.

14. The media processing system of claim 11, wherein the at least one media peripheral is co-located with respect to at least one of the first system and the second system.

15. The media processing system of claim 11, wherein at least one of the first system and the second system comprises one of: a set-top-box based media processing system, a personal computer based media processing system, and a television based media processing system.

16. The media processing system of claim 1, wherein the establishing, the monitoring, and the responding are accomplished at one or both of periodically over time and at one or more pre-designated times.

17. The media processing system of claim 11, wherein the responding comprises at least one of storing the state of at least one status parameter of the plurality of status parameters and displaying the state of the at least one status parameter of the plurality of status parameters.

18. The media processing system of claim 11, wherein the establishing the communication link is automatically initiated by one or more of the first system, the second system, and the at least one media peripheral.

19. A method comprising:
automatically identifying by a first system, at a first location, at least one media peripheral communicatively coupled to one or both of the first system and/or a second system, the second system at a second location;
automatically establishing a communication link between the first system and the at least one media peripheral;
automatically attempting to authorize for status monitoring, the at least one media peripheral by the first system; and
upon successful authorization for status monitoring:
automatically monitoring, by the first system, a plurality of status parameters of the at least one media peripheral that comprise at least two of a battery level, an "on/off" indication, an amount of storage used, and an amount of storage remaining; and
automatically responding, by the first system, to a state of the plurality of status parameters; and
upon unsuccessful authorization for status monitoring, not responding to the state of the at least one status parameter.

20. The method of claim 19, further comprising automatically establishing by the at least one media peripheral, the communication link between the first system and the at least one media peripheral, if a battery level of the at least one media peripheral drops below a threshold battery level.

* * * * *